US009020295B1

(12) United States Patent
Elancheralathan (10) Patent No.: US 9,020,295 B1
(45) Date of Patent: Apr. 28, 2015

(54) IMAGE GLYPH ENHANCEMENT (71) Applicant: Amazon Technologies, Inc., Reno, NV (US)

(72) Inventor: Vasanth Elancheralathan, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 4 days.

(21) Appl. No.: 14/063,833

(22) Filed: Oct. 25, 2013

(51) Int. Cl.
*G06K 9/40* (2006.01)
*G06T 5/00* (2006.01)

(52) U.S. Cl.
CPC . *G06T 5/00* (2013.01); *G06T 5/002* (2013.01); *G06T 5/003* (2013.01)

(58) Field of Classification Search
USPC .......................................... 382/173, 202, 275
See application file for complete search history.

(56) References Cited

U.S. PATENT DOCUMENTS

2007/0140566 A1*  6/2007  Lin et al. ....................... 382/203
2012/0106844 A1*  5/2012  Ramachandrula et al. ... 382/173

\* cited by examiner

*Primary Examiner* — Duy M Dang
(74) *Attorney, Agent, or Firm* — Schwabe Williamson & Wyatt PC (57) ABSTRACT

Embodiments of methods, systems and storage media associated with enhancing glyphs in a scanned image are disclosed herein. Based on properties of a glyph, one or more stroke kernels representing the glyph may be identified or generated. The stroke kernels may be compared to both the glyph and one another, and one or more preferred stroke kernels may be identified. The preferred stroke kernels may be stored and applied to the glyph to enhance the glyph.

22 Claims, 7 Drawing Sheets

IMAGE GLYPH ENHANCEMENT

BACKGROUND

Scanned images, and particularly scanned text, are increasing in popularity and importance as more digital information gets stored online. However, in many cases, a scanned image may be prone to poor quality. For example, images of textual or black and white content may suffer from quality concerns related to image clarity, glyph smoothness, glyph pixel correctness or other issues. Particularly, a book, magazine or some other textual source that is scanned with a low quality scanner may suffer from one or more of the quality issues described above.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2-A is an example process for enhancing one or more glyphs of a scanned image, in accordance with various embodiments.

FIG. 2-B is a more detailed example process for enhancing one or more glyphs of a scanned image, in accordance with various embodiments.

DETAILED DESCRIPTION

Techniques described herein provide the capability enhance one or more glyphs in a computer image. Generally, a glyph may be considered a character, textual character or letter in a written language, a combination of characters or letters, a subelement of a character or letter, a picture or symbol of a language such as a punctuation mark or mathematical character, a picture or some other recognizable element in an image.

Generally, when an image in scanned and input into a computer, portions of the image may be distorted, or artifacts may be introduced to the image. For example, a physical page contain the image may be bent or twisted, or the scanner may be malfunctioning or dirty. As a result, the image may be blurred, contain visual noise or be otherwise difficult to interpret. Therefore, it may be useful to be able to fix the distortion or artifacts in the image.

Initially, it may be useful to graphically review one or more of the glyphs in the image. In embodiments, it may not be necessary to know the specific language, font or other characteristics of the image or glyphs. Instead, each glyph may be processed individually so that the general shape and characteristics of the glyphs may be processed. By processing a large number of glyphs, certain repeated features of the glyphs may be identified. As an example, features of the character "m" may be similar to features of the character "n."

Because the processing is occurring on a number of glyphs, rarely occurring features may be given lesser importance or otherwise culled. For example, if a certain glyph is affected by a high amount of distortion, features of that glyph may be viewed as an error based on repetitive features from similar glyphs that are not affected by a high amount of distortion. Once the repetitive features are identified, then the features may be used to enhance the image or one or more glyphs of the image. Specifically, the learned features may be compared to the glyphs, and glyphs may be altered based on the learned features. As a result, the image may be significantly enhanced and made clearer and more readable to a user.

An image may be input to a computing device, and one or more glyphs of the image may be identified. For a given glyph, the computing device may identify one or more properties of the glyph such as stroke-based properties or font-based properties of the glyph. The computing device may also identify preexisting kernels, masks and patterns of the glyph. Finally, the computing device may attempt to generate one or more kernels, masks and/or patterns based on the glyph.

Using the glyph properties as well as the preexisting or newly generated kernels, masks and/or patterns of the glyph, the computing device may generate one or more stroke kernels of the glyph. Generally, a stroke kernel may represent the glyph or a portion of the glyph. The computing device may perform error resolution on the glyph or one or more of the stroke kernels by fixing small errors in the glyph or the stroke kernels based on known properties of the glyph. Such errors may include, for example, missing pixels in the glyph or blurred edges of the glyph.

Next, the computing device may identify preferred stroke kernels based on one or more criteria such as a confidence interval related to how closely a stroke kernel matches a glyph, spacing or orientation of edges or kernels of the stroke kernel, the size of the stroke kernel or thresholds related to a tendency for the computing device to use a newly generated stroke kernel or preexisting kernels, masks and/or patterns. The computing device may then bin the stroke kernels by identifying similarities between stroke kernels and storing stroke kernels in a kernel/pattern storage. Finally, the computing device may apply one or more of the stroke kernels to the glyph to enhance the glyph in the image.

As described above, the process may be iterative such that each time a glyph is encountered, the stroke kernels associated with that glyph are iteratively updated and become increasingly accurate as a result. An overall image, for example scanned text, may be enhanced and made clearer as a result.

Figure 1:
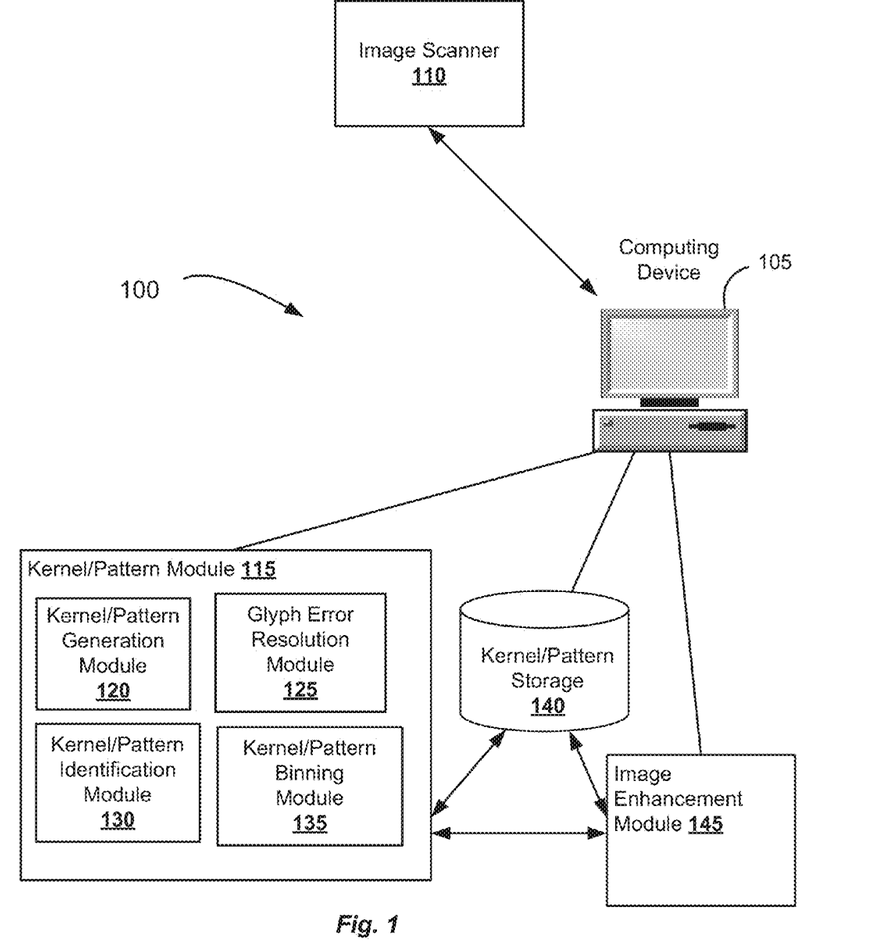
FIG. 1 is a block diagram illustrating an example computer system configured to scan and enhance elements of an image, in accordance with various embodiments.

FIG. 1 is a block diagram illustrating an example computer system 100 configured to generate, apply and iteratively update kernels, masks or patterns used to enhance glyphs in a scanned image. The computer system 100 may include a computing device 105, which may be any appropriate device, such as a laptop computer, a mobile wireless device, an e-book reader, a tablet or a wearable device, among other possibilities. The computing device 105 may be configured to receive input from a user.

The computing device 105 may be coupled with an image scanner 110. The image scanner 110 may be a device configured to capture digital images. For example, the image scanner may be one of a digital camera, a mobile wireless device, a handheld scanner, an industrial scanner, a printer or fax machine including an image scanner or a system involving a plurality of cameras that is designed specifically for the capture of images from books or magazines. The image scanner 110 may be configured to capture one or more images. An image may be a page or a portion of a page of a book, magazine, scroll, periodical, newspaper, printout, advertisement, computer display, photograph, fax or some other type of image-containing display. The image may otherwise include multiple pages of one or more of the elements described above, for example a computer image of several pages of a book appended together.

In some cases, the image may not be received from the image scanner 110, but instead the image may be received by the computing device 105 over a network connection. For example, in some cases the computing device 105 may receive the image over a wired link such as a hypertext transfer protocol (HTTP) link, an Internet protocol (IP) link, an ethernet link, a T1 connection, a universal serial bus (USB) connection or some other sort of wired link. Alternatively, the image may be received by the computing device 105 over a wireless link using a wireless data transfer technology such as an institute of electrical and electronics engineers (IEEE) 802.20 μlink, Evolved High Speed Packet Access (HSPA+), Global System for Mobile Communications (GSM), Enhanced Data rates for GSM Evolution (EDGE), Bluetooth, third generation partnership project (3GPP) long term evolution (LTE), LTE-Advanced or some other wireless protocol. In some cases the image may be received in or associated with an email message, a short message service (SMS) message, a multimedia messaging service (MMS) message, a file transfer protocol (FTP) transfer or some other type of data transfer to the computing device 105.

The computing device 105 may include a kernel/pattern module 115 configured to generate kernels or patterns that may be used to enhance one or more glyphs in an image captured by the image scanner 110. A pattern may be a defined set of kernels. The kernel/pattern module 115 may include one or more of a kernel/pattern generation module 120, a glyph error resolution module 125, a kernel/pattern identification module 130 and/or a kernel/pattern binning module 135.

The kernel/pattern generation module 120, as will be discussed in more detail below, may be configured to identify one or more properties of a glyph in an image received by the computing device 105. The kernel/pattern generation module 120 may be further configured to generate one or more stroke kernels, or alter existing stroke kernels or patterns associated with the glyph, based on the properties of the glyph.

The glyph error resolution module 125, as will be discussed in more detail below, may be configured to fix known errors of the glyph or a stroke kernel associated with the glyph based on known properties of the glyph or a trace path of the glyph.

The kernel/pattern identification module 130, as will be discussed in more detail below, may be configured to identify one or more preferred stroke kernels produced by the glyph error resolution module 125 and/or the kernel/pattern generation module 120. Additionally, the kernel/pattern identification module 130 may be configured to calculate one or more confidence intervals associated with each of the preferred stroke kernels.

The kernel/pattern binning module 135 may be configured to receive the one or more preferred stroke kernels and confidence intervals from the kernel/pattern identification module 130, and bin the preferred stroke kernels appropriately. The binning process may include identifying one or more kernels that are not significant and should be discarded. Additionally or alternatively, the binning process may include identifying stroke kernels in the preferred stroke kernels that are substantially similar to one another, and potentially discarding one or more of the stroke kernels based on that similarity. The binning process may be additionally handled for large quantities of inputs using classification and/or logistic/linear regression models of Machine learning. Implementations of the binning process may support one or more of the necessary parameters for application of one or more known machine learning algorithms to help improve the overall system in terms of speed and efficiency. The features matrix, the hypothesis computation, the error reduction variables may be directly read from the current system and its modules.

The computing device 105 may further include a kernel/pattern storage 140 that is configured to store one or more kernels, patterns or masks of one or more glyphs. The kernel/pattern storage 140 may include one or more of a read only memory (ROM), random access memory (RAM), dynamic random access memory (DRAM), flash memory, phase change memory, or some other type of volatile or non-volatile memory. The computing device 105 may further include an image enhancement module 145 configured to enhance one or more glyphs in an image.

The image enhancement module 145 may be implemented as hardware, software, firmware or some combination thereof. Additionally, the kernel/pattern module 115, or one or more elements of the kernel/pattern module 115 such as the kernel/pattern generation module 120, glyph error resolution module 125, kernel/pattern identification module 130 and/or the kernel/pattern binning module 135 may be implemented as hardware, software, firmware or some combination thereof. The kernel/pattern module 115, kernel/pattern storage 140, and image enhancement module 145 may be communicatively coupled with one another as shown in FIG. 1 and described in further detail below.

Figure 2:
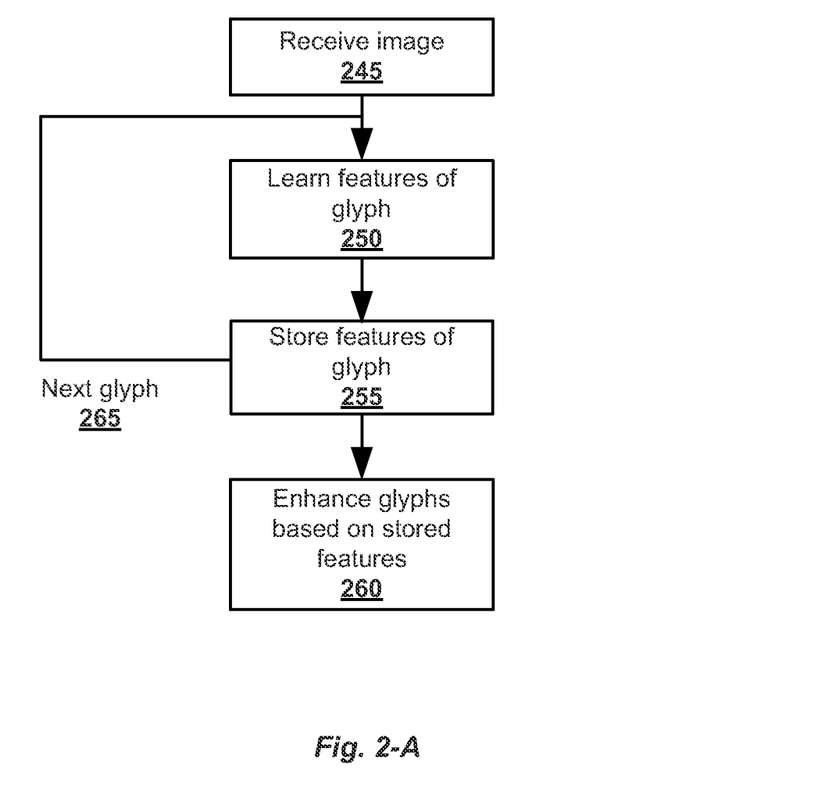

FIG. 2-A illustrates a high level process for enhancing one or more glyphs of a scanned image. As noted above, a glyph may be considered a character, textual character or letter in a written language, a combination of characters or letters, a subelement of a character or letter, a picture or symbol of a language such as a punctuation mark or mathematical character, a picture or some other recognizable element in an image. In embodiments, an image may be received by a computing device at 245. The image may be, for example, scanned, received as a link or attachment over a connection such as an ethernet or internet connection, or otherwise input to a computing device.

The computing device may then perform a processing step to learn different features of the glyph at 250. In embodiments, the features of the glyph may be known as "stroke" elements of the glyph. The features may include, for example, the particular font of the glyph, the shape of certain features of the glyph, the stroke direction of the glyph, or other elements of the glyph. These features may then be stored at 255. For example, the features may be stored in the kernel/pattern storage 140 described above with respect to FIG. 1.

The process of learning features at 250 and storing features at 255 may then be repeated for a next glyph at 265. The next glyph may be the same character or shape as the previous glyph, or it may be an entirely different character or shape than the previous glyph. The process of learning at 250 and storing at 255 may be repeated for all of the glyphs in a word, sentence, paragraph, page, chapter, book or some other portion of an image. Finally the glyphs in the image may be enhanced at 260 based at least in part on the features stored at 255. Specifically, if a glyph is blurry, then some of the blur may be reduced. Alternatively, if a glyph includes artifacts or distortions, those artifacts or distortions may be removed. In other embodiments, the glyphs may be additionally or alternatively enhanced according to a variety of different image processing techniques.

FIG. 2-B illustrates a more detailed example process for enhancing one or more glyphs of a scanned image. As noted above, a glyph may be considered a character, textual character or letter in a written language, a combination of characters or letters, a subelement of a character or letter, a picture or symbol of a language such as a punctuation mark or mathematical character, a picture or some other recognizable element in an image. A stroke-based element of the glyph may be considered an element of the glyph that may be related to how the glyph is created. Stroke-based elements of the glyph may be considered to include graphical elements of a given glyph such as the thickness of one or more portions of the glyph, the number or sharpness of turns in the glyph, the number or length of edges in the glyph, the number or sharpness of curves in the glyph or other elements. By contrast, font-based elements of the glyph may relate to the general shape or configuration of a given glyph. For example, font-based elements may relate to the size of a glyph, the general density of ink in the glyph, the placement or kerning of a glyph or other elements. Pixel-based elements of the glyph may include one or more of the coherency, color or darkness of pixels in the glyph.

The above description of stroke-based, pixel-based and font-based elements is not intended to be definitive, but instead is used as one example of how elements of the glyph may be identified. Alternatively, certain font-based elements may be considered stroke-based or pixel-based, certain stroke-based elements may be considered font-based or pixel-based or certain pixel-based elements may be considered font-based or stroke based elements in different embodiments of the present disclosure.

Generally, a "pattern," as described herein, may include a combination of one or more pixel-based, font-based and stroke-based elements. Particularly, a pattern may be considered to be an overall representation of a glyph or a portion of a glyph. Representation of a pattern may involve collection of kernels along with other properties. A "mask," as described herein, may be considered to be a mathematical or graphical operation that represents a given glyph in an image. Masks may be positive or negative, that is a positive mask may generally relate to the pixels of the glyph itself, while the negative mask may generally relate to the pixels of the space surrounding the glyph. A "kernel," as used herein, may be considered to be a pattern that, if changed by one or more operations, may represent a given glyph in an image. As described herein, one or more masks, or previously existing kernels or patterns, may be used to generate a new kernel or alter a previously existing kernel.

Initially, a computing device such as computing device 105 may receive an image at 200. As described above, the image may be received from an image scanner 110, or through some wired or wireless network connection. The computing device may then identify one or more glyphs in the image at 205. Specifically, a kernel/pattern module such as kernel/pattern module 115, and/or a kernel/pattern generation module such as kernel/pattern generation module 120, may identify the one or more glyphs in the image at 205.

The computing device, or the kernel/pattern generation module of the computing device, may then identify one or more stored kernels or patterns related to the glyph at 210. The stored kernels or patterns may be stored, for example, in a storage such as kernel/pattern storage 140.

The computing device, or the kernel/pattern generation module of the computing device, may then generate one or more stroke kernels for the glyph at 215. As will be described below, the generated stroke kernels may be based on one or more of the previous kernels or patterns for the glyph; stroke elements of the glyph such as direction, turns, edges, corners or thickness of the glyph; font elements of the glyph such as glyph size, ink density or placement; one or more kernels or masks based on the image; or one or more radial polygons generated from the image. One or more of the above described elements may be used to generate one or more stroke kernels that may be considered a pattern or image of the glyph or a portion of the glyph.

The computing device, or a glyph error resolution module of a computing device such as glyph error resolution module 125, may then perform error resolution of the glyph and/or one or more stroke kernels at 220 to generate a resolved glyph and/or stroke kernel. Specifically, the error resolution may involve fixing one or more features of the glyph based on a trace path or additional information regarding the glyph. For example, the error resolution may involve filling in "pits" in the glyph and/or one or more stroke kernels such as a blank pixel surrounded by pixels of the glyph. In this situation, it may be assumed that the blank pixel should instead be a pixel of the glyph. Additionally or alternatively, the error resolution may involve remedying "noise" in the glyph and/or one or more stroke kernels where the glyph or stroke kernel(s) do not have crisp or defined borders. Similarly, the glyph error resolution may involve inserting or sharpening one or more corners of a glyph and/or one or more stroke kernels if the corner is not clearly defined in the glyph or stroke kernel(s).

The computing device, or a kernel/pattern identification module such as kernel/pattern identification module 130, may then identify one or more preferred stroke kernels from the generated stroke kernels at 225. The identification of the preferred stroke kernels may involve a comparison of the stroke kernels generated at 215 with the resolved glyph from 220. Specifically, the identification of the preferred stroke kernels may involve reviewing one or more aspects of the stroke kernels such as a confidence interval of the stroke kernel based on a comparison of the stroke kernel with the glyph, edge or corner characteristics of the stroke kernels, parameter deviance of the stroke kernels such as that caused by aliasing, whether the stroke kernels are newly generated stroke kernels or updates to existing stroke kernels or other parameters. Although the identification of the preferred stroke kernels is described as being performed by a kernel/pattern identification module, in other embodiments one or more of the decisions related to the identification of the stroke kernels may additionally or alternatively be performed by a kernel/pattern binning module such as kernel/pattern binning module 135 of computing device 105.

One or more of the preferred stroke kernels may then be binned at 230, for example by a kernel/pattern binning module such as kernel/pattern binning module 135. In other embodiments, the binning at 230 may overlap or be similar to the identification of the preferred stroke kernels at 225. Specifically, the binning may include the identification of stroke kernels with a lower degree of confidence, or stroke kernels that only apply to relatively small or insignificant portions of a glyph. Additionally or alternatively, the binning may include the comparison of different stroke kernels such that stroke kernels that are similar to one another are merged or discarded to reduce the count of stroke kernels. The stroke kernels may then be stored, for example in a kernel/pattern storage such as kernel/pattern storage 140.

After the stroke kernels are binned at 230, the process may be repeated for a next glyph in the image at 235. Additionally, the glyph may be enhanced using one or more of the binned stroke kernels at 240, for example by an image enhancement module such as image enhancement module 145. Although the description above uses the plural term "stroke kernels" to describe the process, such a term is not intended to be limiting and may instead refer to a singular stroke kernel, one or more patterns or one or more masks.

Figure 3:
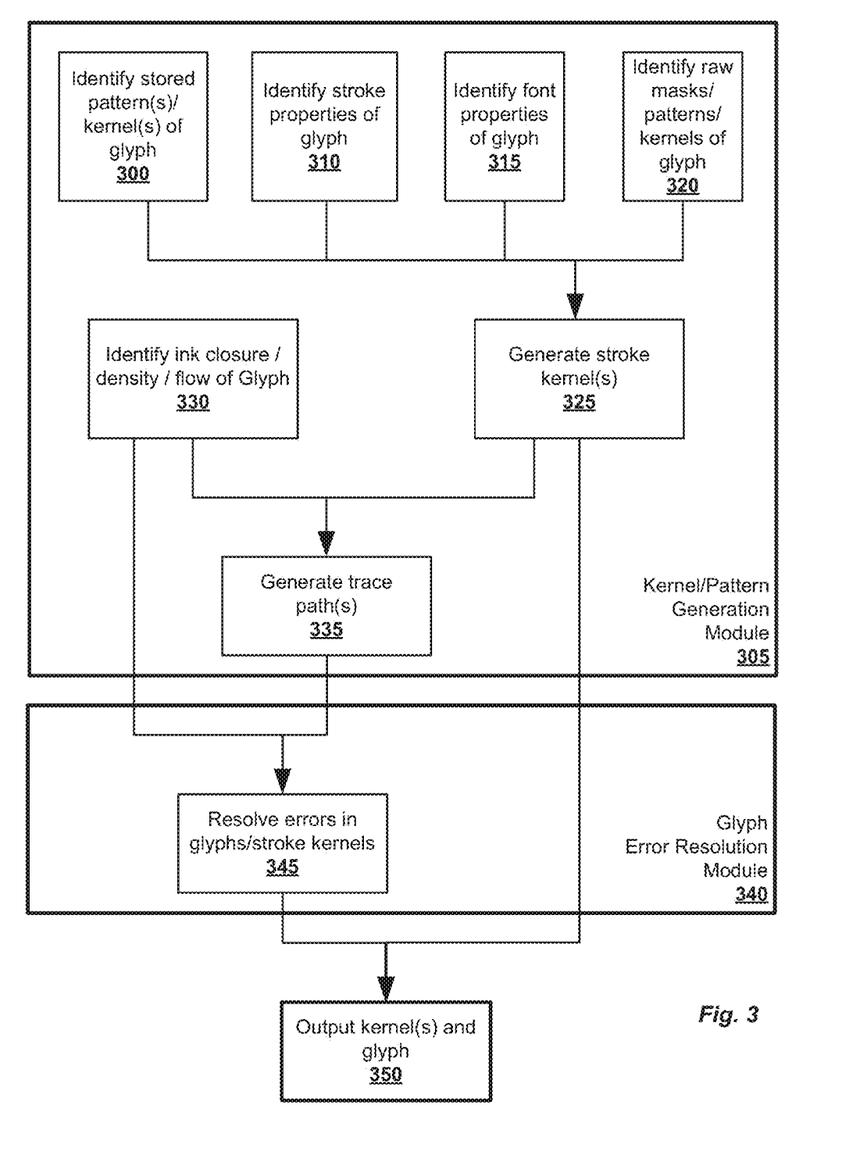
FIG. 3 is a process flow diagram illustrating a process for developing one or more kernels which may be used to enhance one or more glyphs of a scanned image, in accordance with various embodiments.

FIG. 3 is a more detailed illustration of a process such as the process shown in FIG. 2-B. Specifically, FIG. 3 shows details of the generation and identification of different stroke kernels, and may generally correspond to elements 210, 215, and 220 of FIG. 2-B. It is assumed at the outset of the process of FIG. 3 that one or more glyphs in one or more images have been identified by a computing device such as computing device 105.

Initially, one or more stored patterns or kernels of a glyph may be identified at 300, for example by a kernel/pattern generation module 305 which may be similar to the kernel/pattern generation module 120 described with respect to FIG. 1. The one or more stored patterns or kernels may be pre-loaded into the computing system, or may be the result of one or more previous iterations of the process described above with respect to FIG. 2-B. The one or more stored patterns or kernels may be stored, for example in a kernel/pattern storage such as kernel/pattern storage 140.

Additionally, the stroke properties of the glyph may be identified at 310, for example by the kernel/pattern generation module 305. As noted above, the stroke properties of the glyph may include attributes or properties of the glyph such as the stroke direction of the glyph, the thickness of the glyph, the number or shape of curves of the glyph, the number or shape of edges of the glyph or the number or shape of turns of the glyph.

Additionally, the font properties of the glyph may be identified at 315, for example by the kernel/pattern generation module 305. The font properties may include attributes or properties of the glyph such as the specific typeset or font used for the glyph, the size of the glyph, the specific length or direction of edges of the glyph, the number or placement of corners of the glyph or the sharpness of the glyph. As noted above, one or more of the font properties of the glyph and the stroke properties of the glyph may overlap or be similar, and the above examples are not intended to be definitive.

Additionally, raw masks, patterns or kernels of the glyph may be generated at 320, for example by the kernel/pattern generation module 305. As noted above, the masks, kernels, or patterns may be positive or negative, that is relating to properties of the glyph or relating to properties of the space surrounding (or encapsulated by) the glyph. Additionally or alternatively, the masks, patterns or kernels may include one or more polygons that may be generated according to a best fit model. Specifically, the polygons may be generated by breaking one or more portions of the image or the glyph into one or more polygons which are then used as the basis for a mask, pattern or kernel.

One or more of the identified masks, patterns, kernels, polygons or glyph properties may then be used by the kernel/pattern generation module 305 to generate one or more stroke kernels that represent the glyph at 325. Specifically, a stroke kernel may contain information about how the glyph was created, and the general shape of the glyph or portions of the glyph. In some embodiments, the kernel/pattern generation module 305 may generate a plurality of different stroke kernels using different weighted combinations of the various masks, patterns, kernels, polygons or glyph properties.

One or more additional properties of the glyph may then be identified at 330 by the kernel/pattern generation module 305. The additional properties of the glyph may include information related to ink closure(s) of the glyph, density of the glyph or flow of the glyph. An ink closure may be considered a complete mark which may be the glyph or a part of a glyph. For example, the capital letters "A" or "I" may be considered to have a single ink closure. By contrast the lower case letter "i" may be considered to have two ink closures. Specifically, the body of the "i" may be a single ink closure while the dot on top of the "i" may also be a single ink closure.

One or more trace paths may then be generated at 335 by the kernel/pattern generation module 305 based on the one or more stroke kernels generated at 325 and the one or more additional glyph properties identified at 330. A trace path may describe the general shape of the glyph and the order of the different lines. For example, a trace path for the capital letter "E" may be a single vertical line with three roughly parallel horizontal lines on the right side of the single vertical line. The trace path may include or be based on a single stroke kernel or a plurality of stroke kernels. For example, using the example above, a single stroke kernel could represent the vertical line of the capital letter "E," while three additional stroke kernels could represent the parallel horizontal lines of the capital letter "E." After the generation of the trace paths, the kernel/pattern generation module may output the one or more additional glyph properties identified at 330, the trace path(s) generated at 335 and/or the stroke kernel(s) generated at 325.

The glyph error resolution module 340 may receive the additional glyph properties identified at 330 and the trace paths generated at 335. Based on the additional glyph properties and the trace paths, the glyph error resolution module 340 may perform error resolution of the glyph and/or stroke kernels at 345. Specifically, and as described above with respect to 220, the glyph error resolution module 340 may identify known imperfections in the glyph or in one or more stroke kernels based on the trace path(s) or the addition glyph information, and resolve those known imperfections. As an example, the glyph or the stroke kernel may contain a white pixel surrounded by a series of pixels of the glyph, for example black pixels. The glyph error resolution module 340 may be configured to identify that white pixel as a "blank" pixel and identify that the white pixel should instead be a black pixel, because it may generally be unlikely that a glyph in an image will have a single pixel that is different from all of the other pixels surrounding it. This identification may be because most glyphs are unlikely to intentionally have a single pixel that is different from the others.

Similarly, ink closures of the glyph may be used to identify the boundaries or shape of the glyph and sharpen edges or corners of the glyph or stroke kernel. For example, assume that a glyph or stroke kernel has a significant amount of noise and appears blurred or lacking focus. However, if the glyph is identified at 330 as having two ink closures, one of which is a small ink closure directly above a second ink closure which is a generally vertical line, then the glyph error resolution module 340 may identify the glyph as a lower case "i." Therefore, the glyph error resolution module 340 may remove some of the "noise" of the glyph or the stroke kernel by changing pixels that don't correspond to pixels that would be used in a lower case "i" to white pixels at 345.

In some embodiments, the vertical line of the lower case "i" may be based on one or more trace paths generated at 335. Alternatively, one or more of the trace paths generated at 335 may be used to identify an inverted roughly triangular shape which may correspond to the character "V." If the "V" is lacking focus or is blurred, the trace path may be used by the glyph error resolution module 340 to remove some of the "noise" of the glyph by changing pixels that don't correspond to pixels that would be used in the character "V" to white pixels at 345.

Subsequent to the glyph error resolution performed by the glyph error resolution module 340, one or more stroke kernels, such as the stroke kernel(s) generated at 325, and the resolved glyph and/or resolved stroke kernels from 345, may be output at 350. As shown in FIG. 3, the stroke kernel and the resolved glyph are output from the glyph error resolution module, however in other embodiments the stroke kernel(s) generated at 325 may not be passed to the glyph error resolution module 340, and instead may be output directly from the kernel/pattern generation module 305.

Figure 4:
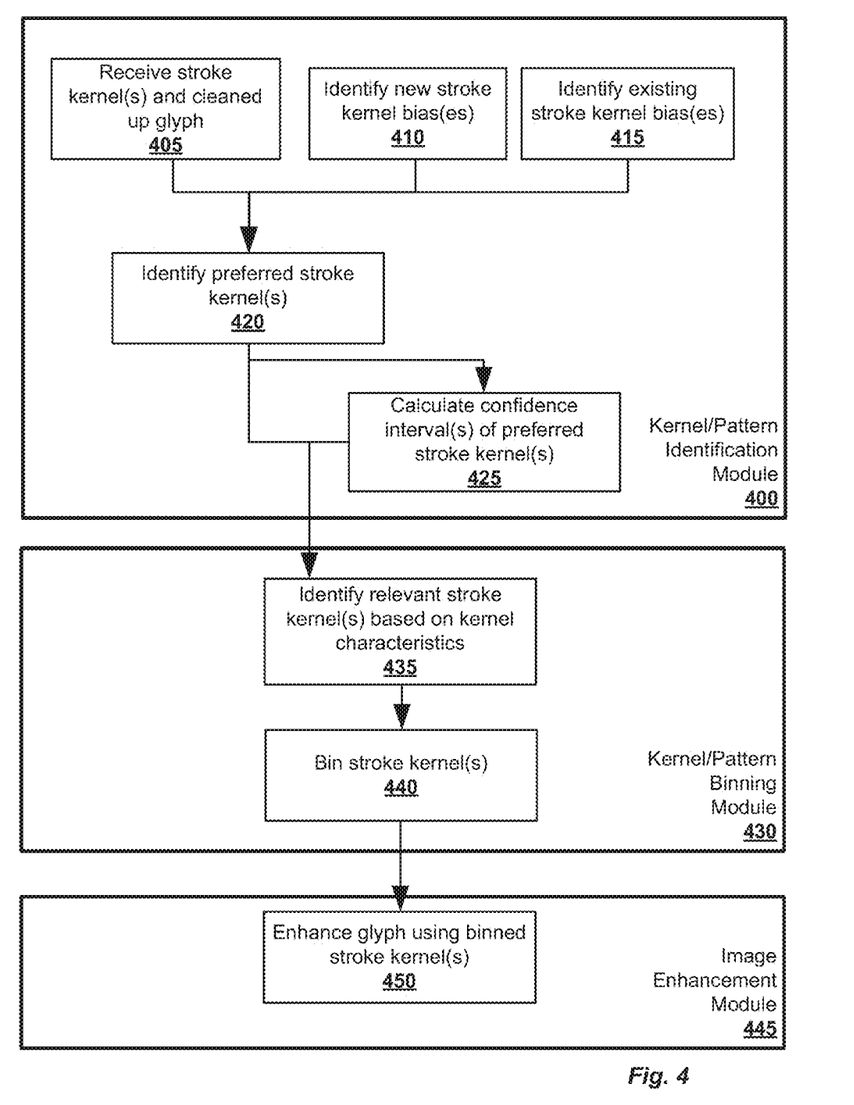
FIG. 4 is a process flow diagram illustrating a process for identifying and applying effective kernels for glyph enhancement, in accordance with various embodiments.

FIG. 4 illustrates an example of a process for storing and using stroke kernel(s) output from the process of FIG. 3 which may generally correspond to elements 225, 230 and 240 of FIG. 2-B. Initially, the process may begin by a kernel/pattern identification module 400, which may correspond to the kernel/pattern identification module 130 of FIG. 1, receiving at 405 the one or more stroke kernel(s) and resolved glyph output at 350. The kernel/pattern identification module 400 may then identify one or more biases towards the use of new stroke kernels at 410, which may be described as a variance box. Similarly the kernel/pattern identification module 400 may also identify one or more biases towards the use of preexisting stroke kernels at 415, which may be described as a penalty box. These biases may be based on, for example, one or more thresholds of comparison of the stroke kernel(s) with the glyph or the resolved glyph, a size of the stroke kernel, the variance between the stroke kernel and those kernels removed/retained during the previous iteration of the binning process, number of dominant pixels retained across each iteration, a number of pixels in the stroke kernel or a comparison of the stroke kernel with a preexisting stroke kernel, mask or pattern such as the preexisting stroke kernel(s), mask(s) or pattern(s) stored in a kernel/pattern storage 140.

The kernel/pattern identification module 400 may then, based on the one or more new stroke kernel biases identified at 410 and the preexisting stroke kernel biases identified at 415, identify one or more preferred stroke kernels at 420. Specifically, the kernel/pattern identification module 400 may identify one or more of the stroke kernels generated at 325 that most closely correspond to the glyph or the resolved glyph output at 345. Subsequently or simultaneously the kernel/pattern identification module 400 may calculate a confidence interval at 425 for each of the preferred stroke kernels identified at 420. The confidence interval may represent, for example, how closely each of the preferred stroke kernels matches the glyph or the resolved glyph output at 345. The confidence interval may be represented as an absolute value, a percentage, a comparison value or some other mathematical representation.

The confidence interval(s) and the preferred stroke kernel(s) may then be output from the kernel/pattern identification module 400 to the kernel/pattern binning module 430. The kernel/pattern binning module 430 may identify relevant stroke kernel(s) based on one or more of the characteristics of the stroke kernel(s) at 435. For example, the kernel/pattern binning module 430 may review the confidence interval(s) output at 425 and discard stroke kernel(s) with a low confidence interval. In some cases, however, the kernel/pattern binning module 430 may not necessary discard a stroke kernel with a low confidence interval if the stroke kernel is generally associated with another stroke kernel with a high confidence interval. In other words, if the stroke kernel for a glyph is generally associated with a stroke kernel of another glyph, and the glyph follows the other glyph, then the stroke kernel of the glyph may not be discarded even if it has a low confidence interval when the other glyph has been enhanced with the stroke kernel with the high confidence value.

Additionally or alternatively, the kernel/pattern binning module 430 may use a heuristic such as a corner projection-connected line (cpcl) or edge projection-connected line (epcl) which identifies, for example, that all of the corners of the glyph are present and in the correct orientation in the stroke kernel, or all of the lines of the glyph are present and are in the correct orientation in the stroke kernel, respectively. Additionally or alternatively, the kernel/pattern binning module 430 may use one or more heuristics based on deviance characterized by parameters such as how much aliasing is present in an application of the stroke kernel, and discard stroke kernels which would result in aliasing. Such aliasing could be the result of, for example, another glyph that is close to and affecting the glyph that is currently being enhanced. Other heuristics may involve, for example, a size or length of the stroke kernel wherein stroke kernels that only represent very small portions of a glyph are discarded. Another heuristic may involve identifying whether the stroke kernel matches a curve of the glyph or resolved glyph, and perhaps altering the stroke kernel so that the curve of the stroke kernel corresponds to the curve of the glyph. The above heuristics are only examples, and other heuristics may be used to include or discard stroke kernels as appropriate. One or more thresholds may be used for one or more of the comparisons listed above. In some cases the thresholds may be absolute numbers, while in other embodiments the thresholds may be percentages or relative values.

Stroke kernels which are not discarded may then be binned at 440 by the kernel/pattern binning module 430. The binning process may involve a comparison of one or more of the stroke kernels to one or more other stroke kernels. If a first stroke kernel is substantially similar to a second stroke kernel, then the second stroke kernel may be discarded. Alternatively, the similar portions of the first stroke kernel and the second stroke kernel may be merged together to form a third stroke kernel, and the first and second stroke kernels may be discarded.

The binning process at 440 may further include storing the stroke kernels, subsequent to the comparison and sorting processes, in the kernel/pattern storage 140. As a result of the process, the stored kernels may generally be kernels that are substantially similar to the glyph or resolved glyph. Because the process may begin with the identification of stored patterns, masks or kernels of a glyph at 300 of FIG. 3, it is possible that the stroke kernels stored at 440 may be more accurate than the preexisting patterns, masks or kernels. Therefore, in some cases the binning process at 440 may include removing one or more preexisting patterns, masks or kernels for a given glyph from the kernel/pattern storage 140 and replacing it with one or more of the stroke kernel(s) binned at 440. In this way, the computing device 105 may iteratively and continuously update the patterns, masks and kernels that are used to identify and/or enhance a glyph in an image. One or more of the stroke kernels binned at 440 may also have more information, for example involve more pixels, than one or more of the preexisting patterns, masks or kernels for the glyph.

Finally, the image enhancement module 445 may apply one or more of the binned stroke kernels to enhance the glyph at 450. An example of such an enhancement may be seen in FIG. 5. Specifically, FIG. 5 may depict the English language word "research" at two different stages of enhancement. Specifically, the word "research" is depicted as initially input to a computing system at 500. The word is depicted at an intermediate stage of enhancement at 505, and the word is depicted at an advanced stage of enhancement at 510. Several portions of the processes described above with respect to FIGS. 2-A, 2-B, 3, and 4 may be seen. For example, stroke kernel error resolution, such as that described at 220 or 345, may be seen at 515. Specifically, errors such as a dead pixel seen in the character "e" in the initial stage 500 are resolved in the letter "e" in the intermediate stage 505 at 515.

Figure 5:
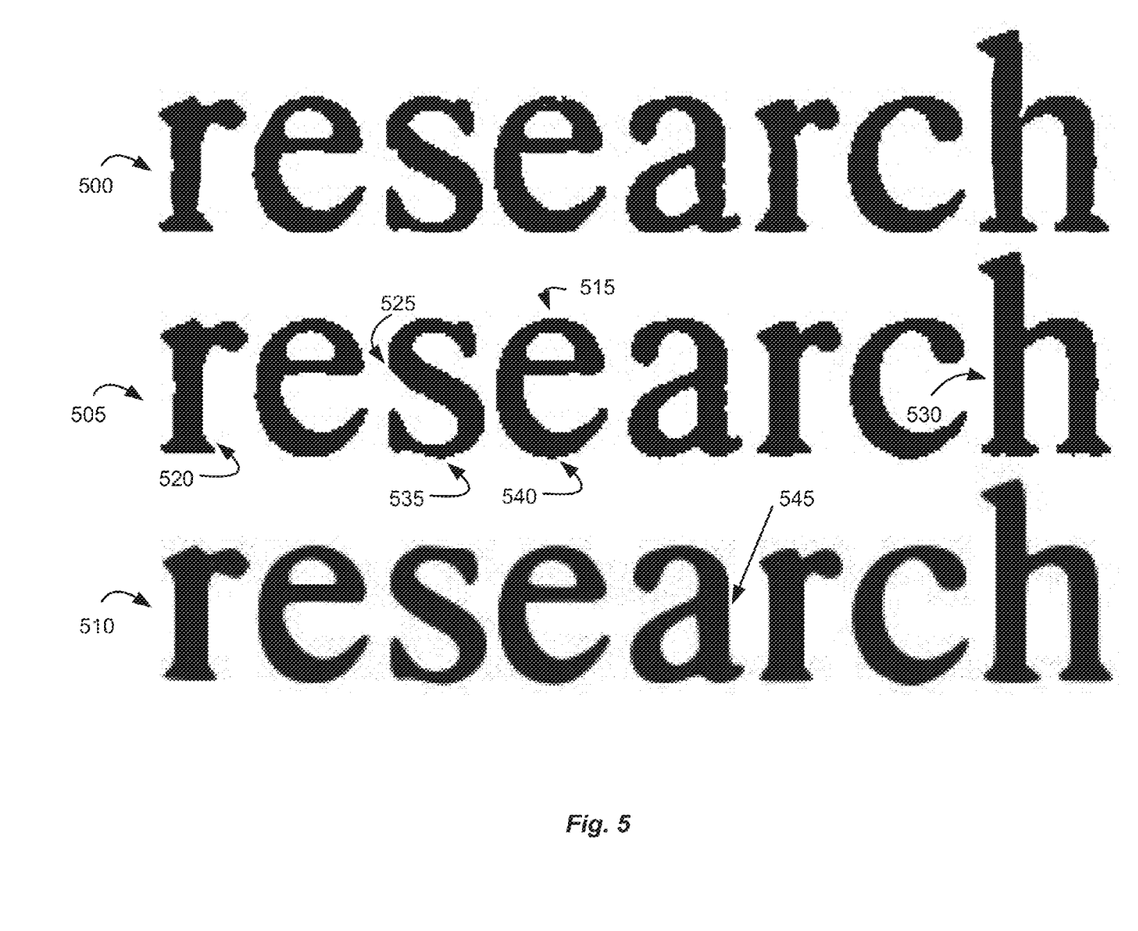
FIG. 5 illustrates an example screenshot of glyph enhancement, in accordance with various embodiments.

Additionally, the results of various image enhancement elements 260, 240 or 450, based on one or more stroke kernels, for example elements may be seen in FIG. 5. For example, the dent in the lower portion of the letter "r" in the initial image 500 may be fixed at 520 in the intermediate stage 505 due to image enhancement. Similarly, a dent in the letters "s" or "h" in the initial image 500 may be fixed at 525 and 530, respectively, in the intermediate stage 505 due to image enhancement. Similarly, at the intermediate stage 505, the curve of the lower portion of the letters "s" and "e" may be induced at 535 and 540, respectively, as shown in FIG. 5.

Increased image enhancement in the advanced stage of enhancement at 510 may also be seen. For example, it can be seen that the letters are generally sharper and more uniform at the advanced stage 510 than at the initial stage 500 or the intermediate stage 505. As a specific example, distortion in the curved portion and the rightmost portion of the letter "a" may be reduced or eliminated at 545.

As described above, the processes described in FIG. 2-A, 2-B, 3, or 4 may be performed iteratively on glyphs. That is, a complete process may be performed on a first glyph in the page so that the stroke kernels are generated, binned, and then the first glyph is enhanced, and then the processes are repeated on second glyphs, third glyphs etc. Stroke kernels may be specific to a single glyph, that is the stroke kernels for the character "a" may be separate from the stroke kernels for other characters. Therefore, each time the character "a" is encountered in an image, the stroke kernels for the character "a" are updated. However, in other embodiments one or more glyphs may share one or more stroke kernels in the kernel/pattern storage 140. For example, the characters "n" and "m" may share one or more stroke kernels in the kernel/pattern storage 140. Additionally or alternatively, the process may go on a word by word, line by line, page by page or some other grouping of portions of the image rather than a character by character basis.

Although the processes, or portions of the processes, described in FIGS. 2, 3 and 4 are described as being performed by specific modules, in other embodiments one or more of the elements of the processes may be performed by alternative modules. Additionally, one or more of the modules may be combined, for example the glyph error resolution module 340 and the kernel/pattern identification module 400. The above arrangement of process elements and modules is merely an example, and not intended to be limiting. Additionally, to the extent that certain processes or procedures are described as occurring sequentially, in some cases certain elements may be performed in parallel with one another and a specific sequence of process elements should not be preferred absent stated intent to the contrary.

Figure 6:
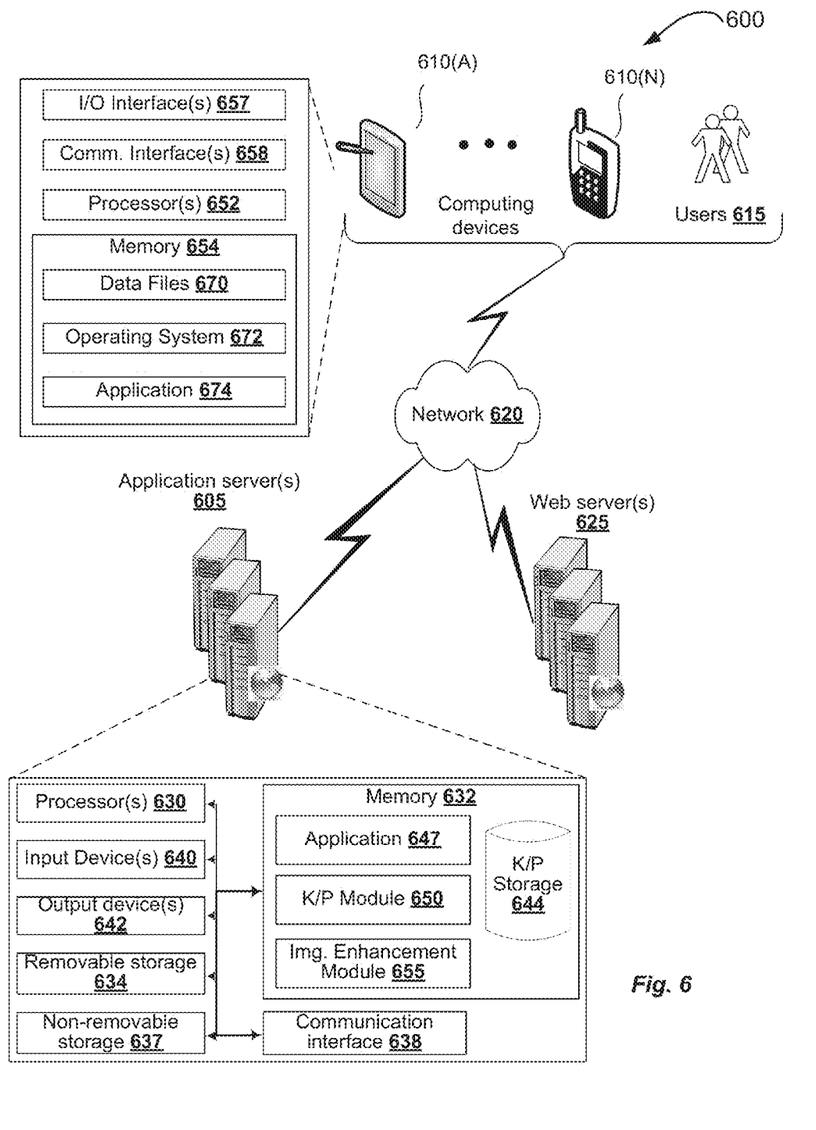
FIG. 6 illustrates an example computing environment in which embodiments described in the present disclosure may be implemented.

FIG. 6 illustrates an example of an illustrative computing environment 600 for implementing aspects in accordance with various embodiments described herein. As will be appreciated, although a Web-based environment is used for purposes of explanation, different environments may be used, as appropriate, to implement various embodiments. The illustrative computing environment 600 may include one or more electronic computing devices 610(A)-610(N), which may include any appropriate device operable to send and receive requests, messages or information over an appropriate network 620 and receive information back. Examples of such computing devices may include personal computers, smartphones, cell phones, handheld messaging devices, laptop computers, set-top boxes, personal data assistants, electronic book readers, tablets computers and the like.

The computing devices 610(A)-610(N) may include a processor 652 and memory 654 for storing processor-executable instructions, such as data files 670, operating system 672, and one or more applications 674. The operating system 672 may be a general purpose operating system such as a Microsoft Windows® operating system, a UNIX® operating system, a Linux® operating system, or an operating system specifically written for and tailored to the computing devices 610(A)-610(N).

The computing devices 610(A)-610(N) may further include at least one or both of the following elements: input/output interface 657 and communication interface 658. The communication interface 658 may enable the computing devices 610(A)-610(N) to communicate data, control signals, data requests, and other information with other resources including computers, data sources, storage devices, and the like, on the appropriate computer network 620 such as the Internet, via wired or wireless connections. The input/output interface 657 may enable the computing devices 610(A)-610(N) to obtain data input from a variety of devices including, but not limited to, a digital pen, a touch screen, a keyboard, a mouse, a scanner, and the like. In addition to the illustrative components described above, a display interface (not shown) may be used for outputting display information to a computer user 615. Typically, the display information may be outputted by the display interface via a display device (e.g., a CRT monitor, an LCD screen, a touch screen, a television, an integrated screen or sets of screens, etc.).

The network 620 may include any appropriate network, including an intranet, the Internet, a cellular network, a local area network, a personal network, or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 654 may generally comprise RAM, ROM, and/or other permanent memory. Thus, in addition to storage in read/write memory (RAM), programming instructions may also be embodied in read-only format, such as those found in ROM or other permanent memory.

The illustrative computing environment 600 may include at least one application server 605 including, or associated with, one or more processors 630, input devices 640, output devices 642, removable storage 634, and non-removable storage 637 that may be connected to a communication interface 638 and memory 632. The memory 632 may include, but is not limited to, one or more applications 647, and may include, for example a kernel/pattern module 650 which may be similar to kernel/pattern module 115 and/or an image enhancement module 655 which may be similar to image enhancement module 145.

The memory 632 may further include a kernel/pattern storage 644 which may be similar to the kernel/pattern storage 140 of FIG. 1. As used herein, the kernel/pattern storage 644 may refer to any device or combination of devices capable of storing, accessing, and retrieving data, which may include any combination and number of data servers, databases, data storage devices and data storage media, in any standard, distributed or clustered environment. It should be understood that there may be many other aspects that may need to be stored in the memory 632, such as user access right information, which may be stored in any of the above-listed mechanisms as appropriate.

The application server 605 may include any appropriate hardware and software for integrating with the kernel/pattern storage 644 as needed to execute aspects of one or more applications for the computing devices 610(A)-610(N), handling a majority of the data access and business logic for an application. The application server 605 may provide image glyph enhancement and stroke kernel generation for any one of computing devices 610(A)-610(B), and may be able to generate content such as text, graphics, audio and/or video to be transferred to a viewer, which may be served to the viewer by a Web server 625 in the form of HTML, XML, or another appropriate structured language in this example. The handling of all requests and responses, (e.g., requests for item information and the information provided in response) as well as the delivery of content between the computing devices 610(A)-610(N) and the application server 605 may be handled by the Web server 625.

It should be understood that the Web and application servers 605 and 625 are not required and are merely example components, as the applications and software components discussed herein may be executed on any appropriate device or host machine as described elsewhere herein. Although not shown, in embodiments the memory 632 may be present, and the programs and data stored thereon may be accessed locally be, a computing device such as computing devices 610(A)-610(N).

Each server 605 or 625 may include an operating system that may provide executable program instructions for the general administration and operation of that server, and may include a computer-readable medium storing instructions that, when executed by a processor (e.g., 630) of the server, may allow the server to perform its intended functions. Suitable implementations for the operating system and general functionality of the servers are known or commercially available, and are readily implemented by persons having ordinary skill in the art, particularly in light of the disclosure herein.

The illustrative computing environment 600 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the illustrative computing environment 600 in FIG. 6 should be taken as being illustrative in nature, and not limited to the scope of the disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method for enhancing a glyph in an image including a plurality of glyphs, the method comprising:
   obtaining, by the computing device, a plurality of binned stroke kernels from the plurality of glyphs, the obtaining including:
      identifying a first glyph and a second glyph in the plurality of glyphs;
      identifying a first property of the first glyph and a second property of the second glyph, based at least in part on the image;
      generating a first stroke kernel based at least in part on the first property of the first glyph and a second stroke kernel based at least in part on the second property of the second glyph;
      adding the first stroke kernel to the plurality of binned stroke kernels based at least in part on a first confidence interval related to a comparison of the first stroke kernel with the first glyph; and
      adding the second stroke kernel to the plurality of binned stroke kernels based at least in part on a second confidence interval related to a comparison of the second stroke kernel with the second glyph; and
   performing, by the computing device, glyph enhancement, the performing including:
      identifying a third glyph;
      modifying the third glyph based at least in part on a first binned stroke kernel from the plurality of binned stroke kernels, wherein the modifying includes removing an artifact of the third glyph, fixing a dead pixel of the third glyph, sharpening the image of the third glyph, or removing visual noise in the third glyph.

2. The method of claim 1, where the first property of the first glyph is a first preexisting pattern of pixels, and wherein the adding includes replacing, by the computing device, the first preexisting pattern of pixels with the first stroke kernel.

3. The method of claim 2, wherein the preexisting pattern of pixels is a mask or a kernel associated with the first glyph.

4. The method of claim 1, wherein the adding the first stroke kernel to the plurality of binned stroke kernels is further based at least in part on a length of a first edge of the first glyph, an angle between a first edge and a second edge of the first glyph, a corner of the first glyph, a pixel density of the first glyph, or a curve of the first glyph.

5. A computer-implemented method for enhancing a glyph in an image, the method comprising:
   identifying, by a computing device, a first glyph in the image;
   generating, by a computing device, a first stroke kernel corresponding to the first glyph;
   updating, by the computing device, a plurality of binned stroke kernels based at least in part on the first stroke kernel;
   identifying a second glyph in the image; and
   modifying, by the computing device, the second glyph based at least in part on the plurality of binned stroke kernels.

6. The method of claim 5, wherein the generating includes altering a first binned stroke kernel of the plurality of binned stroke kernels based at least in part on the first glyph.

7. The method of claim 5, wherein the glyph is a textual character.

8. The method of claim 5, wherein a first binned stroke kernel of the plurality of binned stroke kernels is a mask.

9. The method of claim 5, wherein the glyph is a first glyph in the image and the stroke kernel is based at least in part on a scanned pattern of pixels of a second glyph in the image.

10. The method of claim 5, wherein the updating includes:
    storing, by the computing device, the first stroke kernel in the plurality of binned stroke kernels if a confidence interval is above or equal to a confidence threshold; and
    discarding, by the computing device, the first stroke kernel if the confidence interval is below the confidence threshold.

11. The method of claim 10, wherein the updating further includes storing, by the computing device, the first stroke kernel in the plurality of binned stroke kernels based at least in part on a position of an edge of the stroke kernel.

12. The method of claim 10, wherein the updating further includes storing, by the computing device, the first stroke kernel in the plurality of binned stroke kernels based at least in part on a position of a corner of the stroke kernel.

13. The method of claim 10, wherein the updating further includes storing, by the computing device, the first stroke kernel in the plurality of binned stroke kernels based at least in part on a comparison of the first stroke kernel with a second stroke kernel.

14. One or more non-transitory computer readable media comprising instructions to enhance a glyph in an image, the instructions configured to cause a computing device, upon execution of the instructions by the computing device, to:
    identify a first glyph in the image;
    generate a first stroke kernel corresponding to the first glyph;
    update a plurality of binned stroke kernels based at least in part on the first stroke kernel;
    identify a second glyph in the image; and
    modify the second glyph based at least in part on the plurality of binned stroke kernels.

15. The one or more computer readable media of claim 14, wherein the instructions to generate include instructions to alter a first binned stroke kernel of the plurality of binned stroke kernels based at least in part on the first glyph.

16. The one or more computer readable media of claim 14, wherein the glyph is a textual character.

17. The one or more computer readable media of claim 14, wherein a first binned stroke kernel of the plurality of binned stroke kernels is a mask.

18. The one or more computer readable media of claim 14, wherein the glyph is a first glyph in the image and the stroke kernel is based at least in part on a scanned pattern of pixels of a second glyph in the image.

19. The one or more computer readable media of claim 14, wherein the instructions to update include instructions to:
    store the first stroke kernel in the plurality of binned stroke kernels if a confidence interval is above or equal to a confidence threshold; and
    discard the first stroke kernel if the confidence interval is below the confidence threshold.

20. The one or more computer readable media of claim 19, wherein the instructions to update further include instructions to store the first stroke kernel in the plurality of binned stroke kernels based at least in part on a position of an edge of the stroke kernel.

21. The one or more computer readable media of claim 19, wherein the instructions to update further include instructions to store the first stroke kernel in the plurality of binned stroke kernels based at least in part on a position of a corner of the stroke kernel.

22. The one or more computer readable media of claim 19, wherein the instructions to update further include instructions to store the first stroke kernel in the plurality of binned stroke kernels based at least in part on a comparison of the first stroke kernel with a second stroke kernel.

* * * * *